March 9, 1948. W. H. ALLEN 2,437,492
MEANS FOR TRANSFERRING HEAT TO OR FROM MATERIAL ON BAND CONVEYORS
Filed March 22, 1945 3 Sheets-Sheet 2
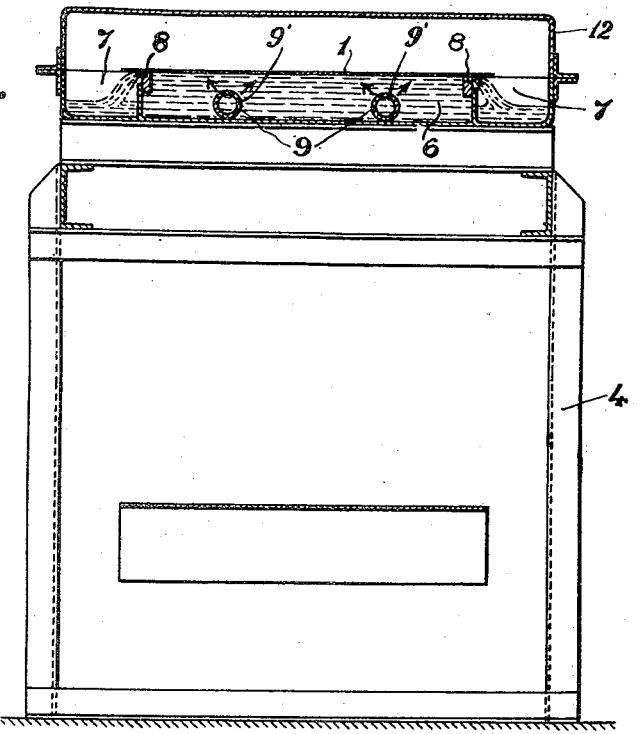
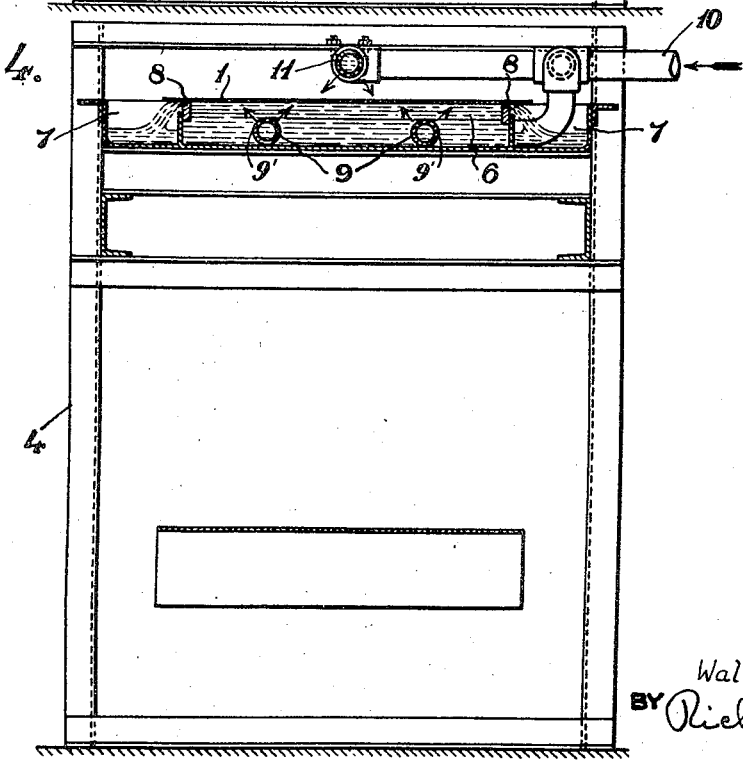
INVENTOR
Walter H. Allen
BY Richards Geier
ATTORNEYS

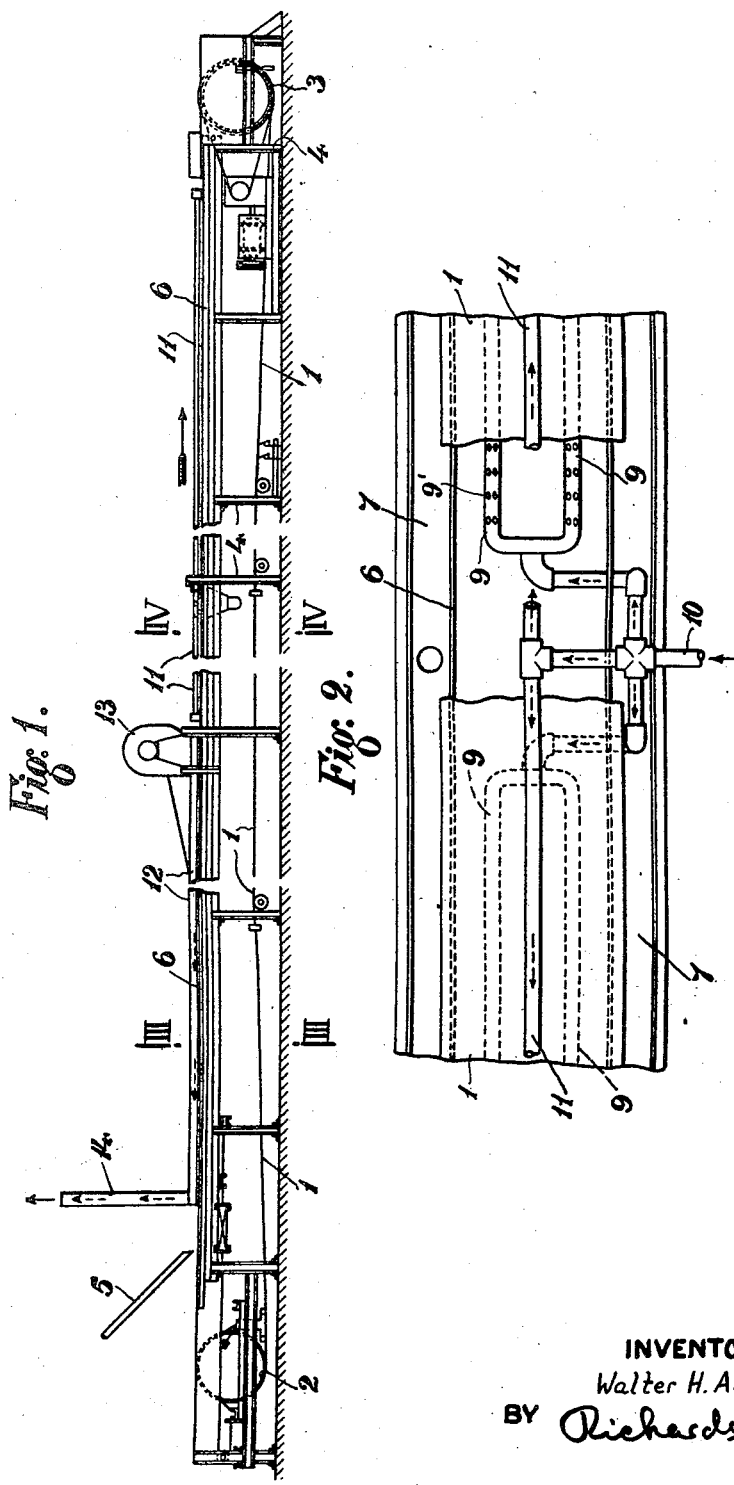

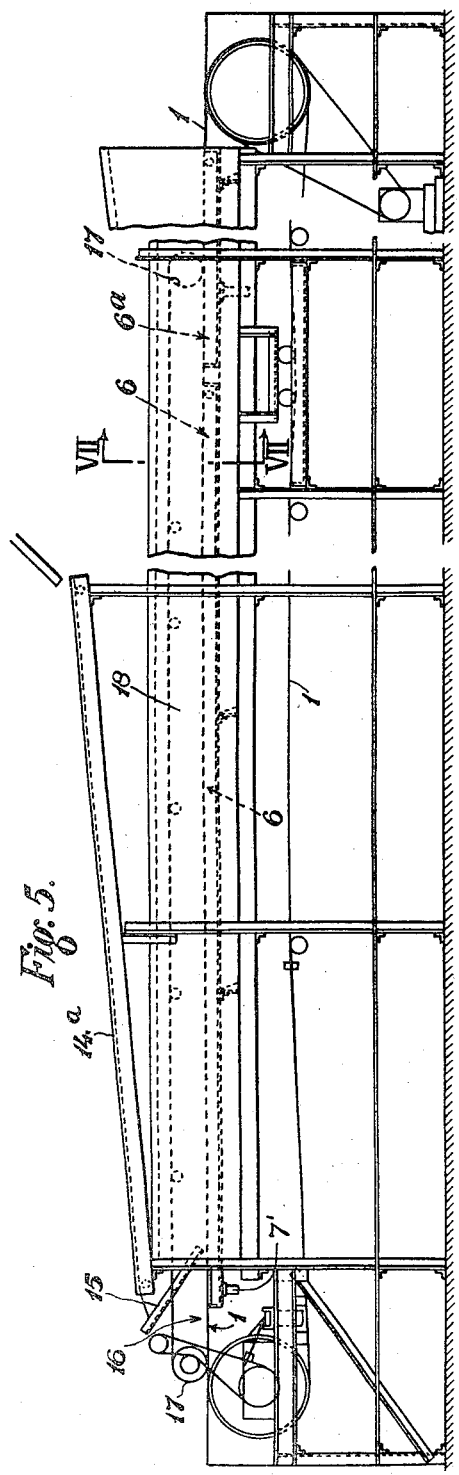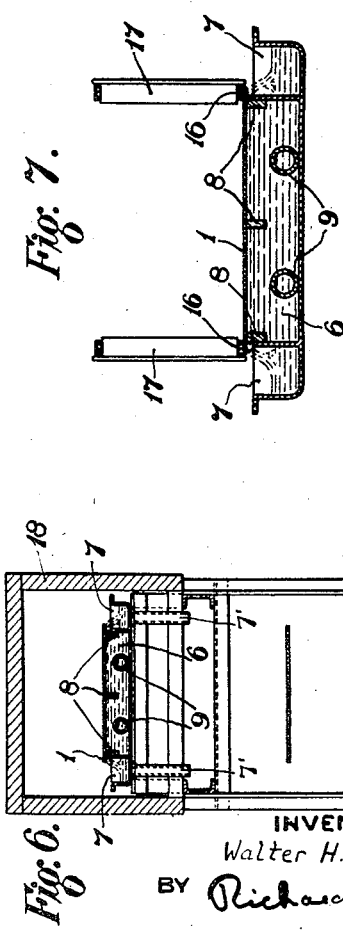

Patented Mar. 9, 1948

2,437,492

UNITED STATES PATENT OFFICE 2,437,492

MEANS FOR TRANSFERRING HEAT TO OR FROM MATERIAL ON BAND CONVEYORS

Walter Harvey Allen, Birmingham, England, assignor to Sandvik Steel Incorporated, New York, N. Y.

Application March 22, 1945, Serial No. 584,218
In Great Britain March 25, 1944

1 Claim. (Cl. 257—23)

This invention relates to a means for transferring heat to or from material carried upon a band conveyor. The invention is especially suitable for cooling plastic, fluid or other substances and for solidifying or crystallising such substances as are capable of being solidified or crystallised by the abstraction of heat therefrom.

The object of the invention is to provide an improved method of and means for transferring heat from material carried upon a band conveyor, for cooling the material, whereby the heat transfer is effected quickly and in a uniform and efficient manner.

According to the invention, a method of transferring heat from material consists in carrying said material upon an endless conveyor band passing around terminal drums having horizontal axes, and causing the said conveyor band to move over and to rest or float directly upon the upper surface of cooling or heating liquid within a tank or trough disposed beneath a strand of the band that carries the material.

Also, according to the invention, a method of cooling material consists in carrying said material upon an endless conveyor band passing around terminal drums having horizontal axes, and causing the said conveyor band to move over and to rest or float directly upon the upper surface of cooling liquid which is circulating through a tank or trough disposed beneath a strand of the band that carries the material. A plurality of successive tanks or troughs may be provided respectively containing cooling liquid at different temperatures.

Means for transferring heat from material carried upon a band conveyor, according to the invention, comprises, in combination with an endless conveyor band passing around terminal drums having horizontal axes, one or more tanks or troughs disposed beneath the top strand of the band and adapted to be filled with a cooling or heating liquid up to the underside of the band so that the said underside travels in direct contact with and floats upon the upper surface of said liquid.

The conveyor band may be supported upon longitudinal slide bars carried upon the tank or trough. Side overflow compartments or channels may be provided into which cooling liquid overflows from the one or more tanks or troughs, said compartments or channels having outlets for the discharge of the liquid.

The forced circulation of cooling liquid through the one or more tanks or troughs may be effected by means of longitudinal perforated pipes in said tanks or troughs and through which liquid is forced by a pump.

Figure 1 of the accompanying drawings is a side elevation, partly in section, of one example of cooling apparatus according to the invention. This particular apparatus shown is suitable for cooling pitch or similar products, and may be modified to suit other substances.

Figure 2 is a plan, with a portion of the conveyor band broken away, of a small portion of the apparatus, showing the cooling tank in plan and convenient means for admitting the cooling liquid.

Figure 3 is a cross-section, on a larger scale than Figure 1, upon line III—III, Figure 1.

Figure 4 is a corresponding cross-section on line IV—IV, Figure 1.

Figure 5 is a side elevation of a modified form of apparatus having provision for effecting the cooling in successive stages at different temperatures.

Figure 6 is a cross-section through the conveyor band and tank.

Figure 7 is a cross-section on line VII—VII, Figure 5, showing the side retaining bands that may be used.

Referring to Figures 1 to 4 of the said drawings, which show one example of the invention which is suitable in connection with the continuous cooling, solidifying or crystallising of hot fluid or plastic material, the apparatus comprises a band conveyor consisting of an endless steel or other heat-conducting band 1 disposed horizontally and running around terminal drums 2, 3, mounted upon a frame 4, one of which drums is suitably driven, as from an electric motor operating through reduction and speed-varying gear. Above the charge end of the conveyor is an inclined plane or feed chute 5 from which the material is deposited upon the top surface of the band so that it spreads out to form a thin uniform layer that is continuously carried along by the band; but it is to be understood that any other means for feeding the material on to the band may be employed.

Mounted upon the conveyor frame 4, beneath substantially the full length of the top strand of the band, is a longitudinal main tank or trough 6 adapted to contain a large body of water or other cooling liquid which is maintained in continuous circulation as hereinafter described. This main tank 6 has a width equal to nearly the full width of the band, and on opposite sides thereof are longitudinal overflow compartments or channels 7, 7, having suitable outlets 7'. The side walls of the main tank have fixed to their upper portions vertically-disposed narrow longitudinal brass or other suitable slide bars 8 which project above said side walls and upon the top edges of which the band 1 is directly supported and travels. Water or other cooling liquid is continuously admitted to the main tank 6 through an inlet 10 and thus maintains the latter full, with the band directly resting or floating upon the surface of the liquid between the slide bars, thus abstracting heat from the band and from the material thereon and progressively cooling the latter. As cooling liquid continues to enter the tank, liquid overflows between the band 1 and the slide bars 8 into the side compartments or channels 7, and thence it is discharged through the outlet.

Conveniently the cooling liquid is supplied to the tank through one, two or more longitudinal perforated pipes, such as 9, 9, lying upon the bottom of the tank and from the holes 9' in which the liquid is directed upwards in oblique directions towards the band. These pipes may be in two longitudinal sections, those of each section being connected together near the middle of the length of the tank and the two sections being connected to a common inlet pipe 10 through which the liquid is supplied from a pump (see Figure 2). This common inlet pipe 10 may, when dealing with a material that is insoluble and non-absorbent, also supply cooling liquid to a longitudinal overhead spraying pipe 11 mounted on the conveyor frame above the band so as to spray liquid on to the material to give a secondary cooling effect. This secondary cooling pipe may extend for any suitable length of the band, but when fumes are liable to be evolved from the hot material, as in the case of pitch, the first section of the band from the charge end may be enclosed within a tunnel or casing 12 constituting an air duct at one end of which is a motor-driven fan 13 which causes a current of air to traverse the duct. This air stream carries away the fumes through a suitable outlet 14 and also helps to cool the material. If desired, an air duct of this character may extend for the full length of the band with or without the overhead spraying pipe.

As there is a large body of water in the main tank which is in direct contact with the underside of the band and which is also in constant circulation, a very effective exchange of heat takes place between the band and the water, resulting in a rapid continuous cooling of the material on the band as it is carried forward towards the discharge end of the band where it may break off by its own weight or may be removed by a scraper or the like.

The modification represented in Figures 5 to 7 is suitable for use with materials having a high fluid content, such as gelatine, for example, the cooling being effected in several different stages at different temperatures, and provision being made for confining it laterally upon the band whilst in a liquid state. Thus, the liquid material may be fed first on to an inclined water-cooled tray 14a or any other form of pre-cooler located above the charge end of the band 1, being delivered from this pre-cooler on to a deflector plate 15 and thence on to the band where, for a certain length of the said band, the material may be confined laterally between rubber or other side bands, chains or other endless flexible members 16 running over pulleys 17 and driven by frictional contact with the conveyor band 1 so that said band and flexible members 16 travel at the same velocity. The cooling of the material whilst travelling upon the band may be effected by one, two or more separate tanks or troughs located beneath the top strand of the band and through which cooling liquid is circulated in direct contact with the band as hereinbefore described, the liquid in the different tanks (if more than one) being at different temperatures. Thus, in the particular example shown, two tanks 6, 6a used. The first of these tanks 6 may extend for about one half the length of the band from the charge end, and gives a normal cooling. The second tank 6a extends for the remainder of the length of the band and may be designed to give a low temperature cooling, the cooling liquid being below the freezing point of water. Side overflow compartments or channels 7 may be provided as in Figures 1 to 4, the cooling liquid being circulated by pipes 9. In this apparatus an air duct 18 may be provided above the entire length of the band, with means for causing a current of cold air to pass therethrough. The order of cooling in the different tanks may be varied as may be desired. For example, a low temperature cooling may precede cooling at a higher temperature.

If desired, there may be three slide bars 8, one along the middle of the tank, mid-way between those fixed to the side walls, being designed to support the middle portion of the band and being secured in any suitable manner.

I claim:

An apparatus for cooling material carried upon a horizontal strand of an endless metal conveyor band, said apparatus comprising a vessel extending longitudinally beneath said strand and being of substantial depth throughout its length and width, said vessel having a flat bottom and upstanding side walls extending to said strand, a plurality of laterally spaced apertured pipes disposed within said vessel on the bottom thereof and extending longitudinally throughout substantially the entire length of the vessel, and means maintaining a continuous forced circulation of cooling liquid through said pipes and vessel and causing said liquid to maintain a normal level which is such that the underside of the band is in contact with the liquid and that the liquid overflows the top edges of the side wall, whereby said strand floats on the liquid and whereby jets of liquid from the apertured pipes pass through the liquid and are thoroughly mixed with the liquid already contained in the vessel before they reach said strand.

WALTER HARVEY ALLEN.

REFERENCES CITED

The following references are of record in the file of this patent:

UNITED STATES PATENTS

| Number | Name | Date |
|---|---|---|
| 810,864 | Hoover et al. | Jan. 23, 1906 |
| 1,869,232 | Weiland | July 26, 1923 |
| 2,006,919 | Haug | July 2, 1935 |
| 2,015,168 | Varney | Sept. 24, 1935 |
| 2,094,785 | Flint | Oct. 5, 1937 |
| 2,286,225 | Noyes | June 16, 1942 |
| 2,360,100 | Bowen | Oct. 10, 1944 |